Figure 1:
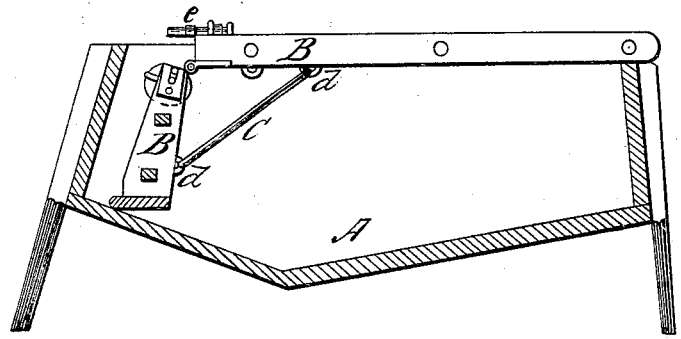

J. DeLong,
Washing Machine.

Nº 33,878.    Patented Dec. 10, 1861.

Witnesses.
C. U. Alexander
A. A. Yeatman

Inventor.
John De Long

UNITED STATES PATENT OFFICE.

JOHN DE LONG, OF MONROE, WISCONSIN.

IMPROVED WASHING-MACHINE.

Specification forming part of Letters Patent No. 33,878, dated December 10, 1861.

*To all whom it may concern:*

Be it known that I, JOHN DE LONG, of Monroe, in the county of Greene and State of Wisconsin, have invented certain new and useful Improvements in Washing-Machines; and I do hereby declare that the following is a full, clear, and exact description of the same, reference being had to the accompanyings, and to the letters of reference marked thereon.

In the annexed drawings, making part of this specification, A represents the wash-box, which is constructed in any of the usual ways, but of a form similar to that in the drawings.

Figure 2:
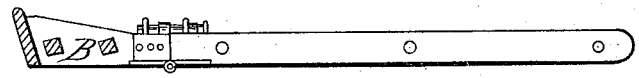

B represents a frame, which is made in two parts and hinged together, as shown at x. On the under side of the frame are four staples d d—two upon each portion—which are connected together by means of bars or rods C. Several staples may be used one behind the other, so that the rubber may be adjusted at different angles. Upon the upper side of the frame are two pins on one side of the hinge and two staples upon the other. When the frame is straightened, as seen in Fig. 2, the pins are shoved endwise, so that they catch in the staples, and thus station the frame in the position seen in Fig. 2. The frame is provided either with an axle or with pins, which answer that purpose, on each side, and the axle or pins have proper bearings or journal-boxes in the sides of the box, so as to allow the frame to oscillate. The clothes are placed in the box and washed by working the handle of the frame up and down, thus moving the rubber over the clothes.

Having thus fully described my invention, what I claim as new, and desire to secure by Letters Patent, is—

The employment of the adjustable hinged frame B, forming both a lever and rubber when constructed and arranged to operate with the box A, as and for the purpose specified.

JOHN DE LONG.

Witnesses:
    T. H. EATON,
    J. JONES.